United States Patent
Hornbeck

(10) Patent No.: US 11,439,485 B2
(45) Date of Patent: Sep. 13, 2022

(54) MOUNTING ELEMENT FOR PRODUCTION OF A DENTAL PROSTHESIS, A PROSTHESIS AND METHOD OF MANUFACTURING SAME

(71) Applicant: JADE FINANCE S.A.R.L., Luxembourg (LU)

(72) Inventor: Jacques Hornbeck, Luxembourg (LU)

(73) Assignee: JADE FINANCE S.A.R.L., Luxembourg (LU)

( * ) Notice: Subject to any disclaimer, the term of this patent is extended or adjusted under 35 U.S.C. 154(b) by 190 days.

(21) Appl. No.: 16/624,197

(22) PCT Filed: Jun. 19, 2018

(86) PCT No.: PCT/EP2018/066266
§ 371 (c)(1),
(2) Date: Dec. 18, 2019

(87) PCT Pub. No.: WO2018/234310
PCT Pub. Date: Dec. 27, 2018

(65) Prior Publication Data
US 2020/0214813 A1 Jul. 9, 2020

(30) Foreign Application Priority Data
Jun. 20, 2017 (LU) ........................ 100319

(51) Int. Cl.
*A61C 13/12* (2006.01)
*B33Y 10/00* (2015.01)
(Continued)

(52) U.S. Cl.
CPC .......... *A61C 13/12* (2013.01); *A61C 13/0004* (2013.01); *A61C 13/0019* (2013.01);
(Continued)

(58) Field of Classification Search
CPC . A61C 13/12; A61C 13/0019; A61C 13/0013; B33Y 10/00
See application file for complete search history.

(56) References Cited

U.S. PATENT DOCUMENTS 2,386,104 A * 10/1945 Galley ................... A61C 13/20
29/256
5,342,696 A * 8/1994 Eidenbenz ......... A61C 13/0022
428/542.8
(Continued)

FOREIGN PATENT DOCUMENTS

ES 1162258 U 8/2016
WO 2013167903 A1 11/2013

OTHER PUBLICATIONS

EP Examination Report dated Jul. 20, 2021 re: Application No. 18 731 101.4-1122, pp. 1-8, citing: US2015/099243 A1, WO 2013/167903 A1, US 2005/276672 A1 and ES1 162 258 U.
(Continued)

Primary Examiner — Jacob J Cigna
(74) Attorney, Agent, or Firm — Cantor Colburn LLP

(57) ABSTRACT

A mounting element for a dental prosthesis, the prosthesis including at least one bridge, the mounting element and prosthesis being formed using 3D printing, where the mounting element has an axis of elongation and comprises an engagement portion, for fixedly engaging the prosthesis and an attachment portion, for enabling secure attachment of the prosthesis to the jig during machining, the mounting element further comprises a registration portion for aligning, in use, the prosthesis in a precise position and/or orientation on a jig during machining, the registration portion comprises a tapering portion having a conically tapering outer surface.

15 Claims, 3 Drawing Sheets

(51) Int. Cl.
   *B33Y 80/00* (2015.01)
   *A61C 13/00* (2006.01)
   *A61C 13/271* (2006.01)

(52) U.S. Cl.
   CPC .............. *A61C 13/26* (2013.01); *B33Y 10/00* (2014.12); *B33Y 80/00* (2014.12)

(56) References Cited

U.S. PATENT DOCUMENTS

| | | | | |
|---|---|---|---|---|
| 5,527,182 | A * | 6/1996 | Willoughby | A61C 8/0074 433/172 |
| 6,224,371 | B1 * | 5/2001 | De Luca | A61C 8/0051 433/49 |
| 6,283,753 | B1 * | 9/2001 | Willoughby | A61C 8/0039 433/172 |
| 6,627,327 | B2 * | 9/2003 | Reidt | A61C 13/0022 428/34.1 |
| 6,824,384 | B1 * | 11/2004 | Bompard | A61C 1/084 433/173 |
| 8,402,624 | B2 * | 3/2013 | Galehr | A61C 13/0022 29/281.1 |
| 8,443,502 | B2 * | 5/2013 | Galehr | A61C 13/0022 29/281.1 |
| 8,568,897 | B2 * | 10/2013 | Ganley | A61C 13/08 428/542.8 |
| 9,022,784 | B2 * | 5/2015 | Johansson | A61C 13/04 433/172 |
| D754,860 | S * | 4/2016 | Ikenaga | D24/181 |
| 10,149,742 | B2 * | 12/2018 | Yeom | A61C 13/0022 |
| 10,245,123 | B2 * | 4/2019 | Bertagnon | B23Q 3/103 |
| 2005/0276672 | A1 | 12/2005 | Prince et al. | |
| 2008/0108014 | A1 * | 5/2008 | Holzner | A61C 9/0093 433/163 |
| 2009/0075238 | A1 * | 3/2009 | Galehr | A61C 13/0022 433/213 |
| 2009/0130634 | A1 * | 5/2009 | Ganley | A61C 13/0022 433/206 |
| 2010/0021865 | A1 * | 1/2010 | Uckelmann | A61C 1/0061 433/173 |
| 2013/0309632 | A1 * | 11/2013 | Sanders | A61C 8/0022 433/174 |
| 2014/0106302 | A1 * | 4/2014 | Yeom | A61C 8/006 433/173 |
| 2015/0093720 | A1 * | 4/2015 | Beeby | A61C 13/08 433/202.1 |
| 2015/0099243 | A1 | 4/2015 | Steger | |
| 2016/0067015 | A1 * | 3/2016 | Yeom | A61C 8/0068 29/896.1 |

OTHER PUBLICATIONS

International Search Report dated Aug. 7, 2018 re: Application No. PCT/EP2018/066266, pp. 1-4, citing: US 2015/0099243 A1, WO 2013/167903 A1 and US 2005/0276672 A1.

Written Opinion dated Aug. 7, 2018 re: Application No. PCT/EP2018/066266, pp. 1-8, citing: US 2015/0099243 A1 and WO 2013/167903 A1.

* cited by examiner

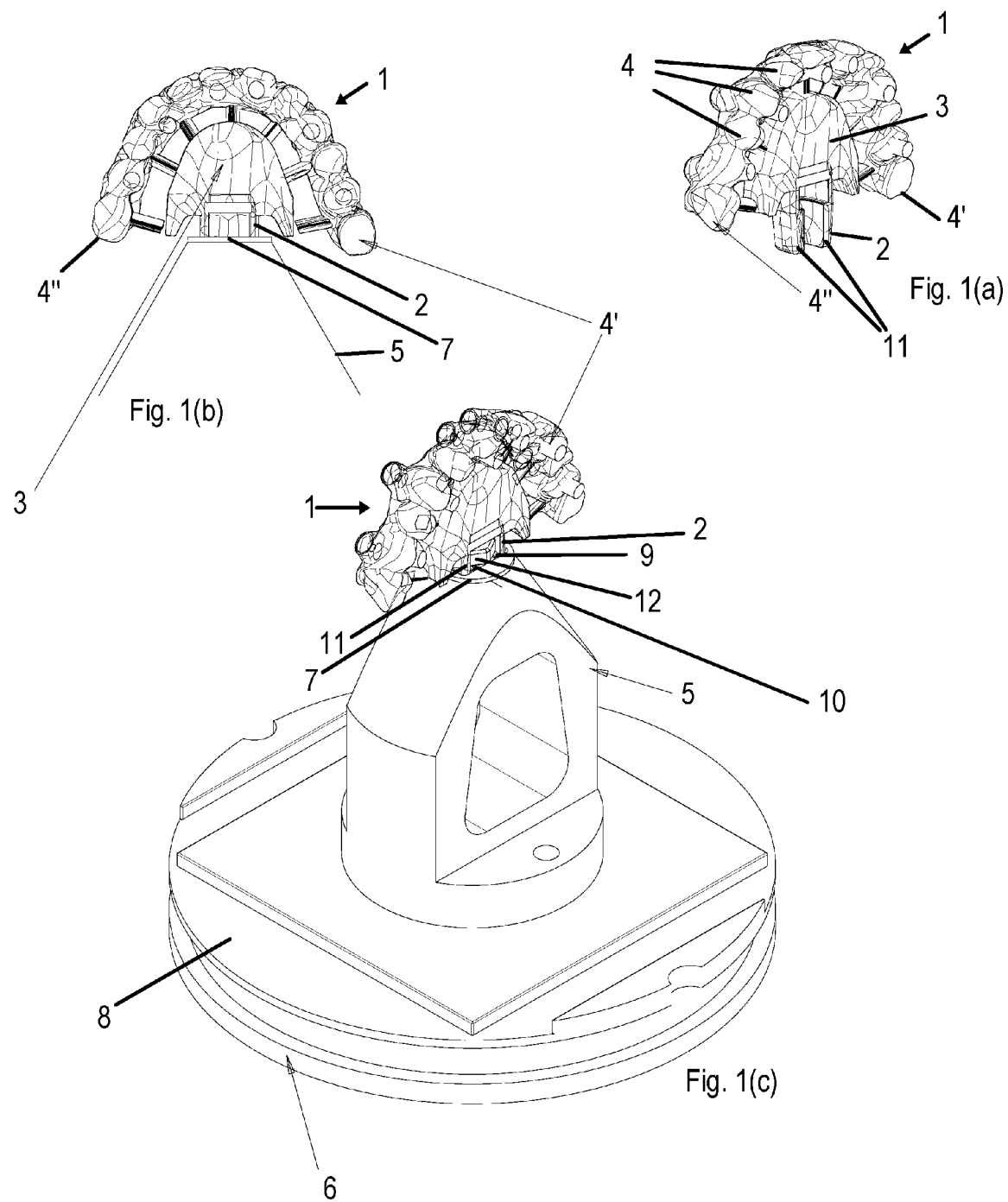

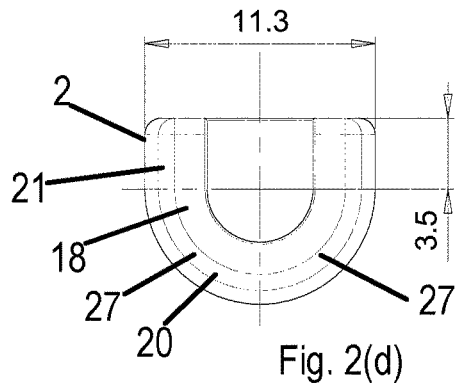
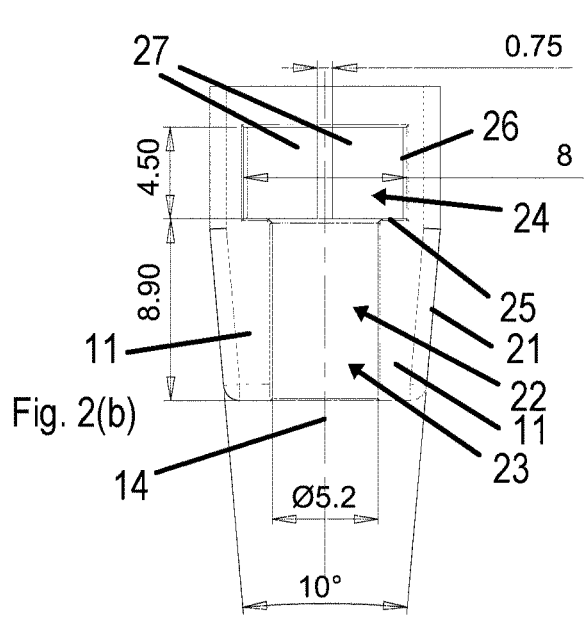
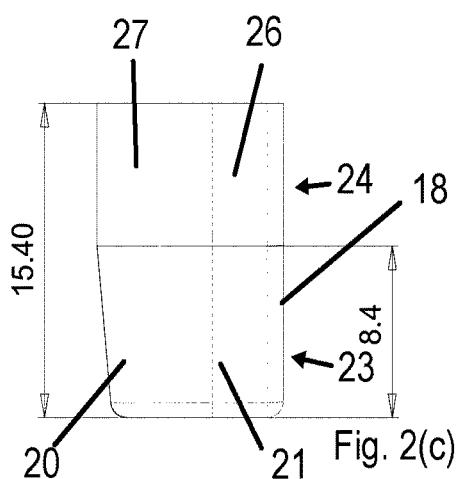
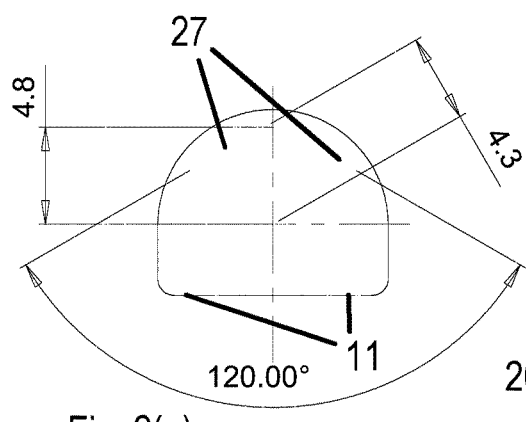
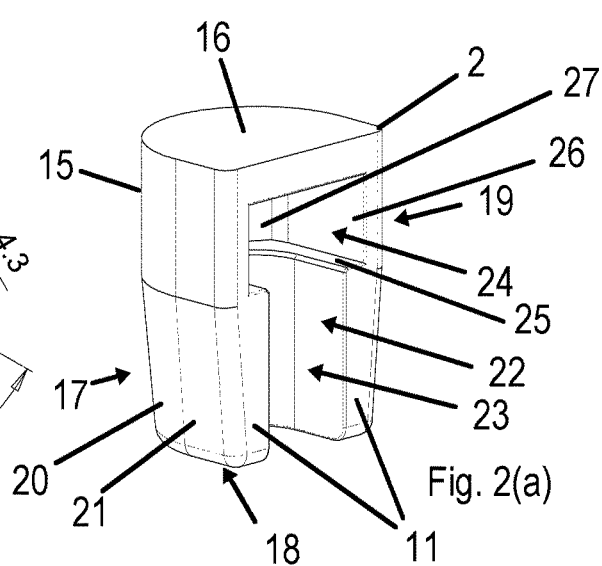

MOUNTING ELEMENT FOR PRODUCTION OF A DENTAL PROSTHESIS, A PROSTHESIS AND METHOD OF MANUFACTURING SAME

TECHNICAL FIELD

The present disclosure generally relates to techniques for the production of a dental prosthesis. The disclosure more particularly relates to a mounting element for production of a dental prosthesis, a prosthesis and to a method of manufacturing a dental prosthesis.

BACKGROUND

Dental implants are often used when a patient requires a prosthetic device to hold one or more artificial teeth in place.

Tooth crowns may also be manufactured using 3D printing. For the production of a dental implant and/or an artificial prosthesis, 3D laser printing has shown to be the most adequate one of all sorts of different 3D printing. This allows the production of the artificial prosthesis or crown to be made out of material such as titanium. In order to be able to produce the artificial prosthesis or crown, the patient mouth is scanned for generating a 3D digital representation of the patient's set of teeth. This representation is then used for generating a physical embodiment with rapid prototyping technology serving as a master model. A machined hole is drilled in the master model at the exact position at which the dental implant will be inserted into the patient jawbone. The dental fixture as well as at least one dental implant abutment is form fit inserted into the machined hole in the master model. The master model is then used for producing the dental implant and/or an artificial prosthesis by 3D laser printing.

It is known to produce a dental implant and/or an artificial prosthesis using 3D laser printing using a plate, the plate comprising at least one abutment cavity provided in a first surface of the plate to lodge a dental implant abutment. The dental implant abutment can comprise a carrier portion and an abutment body, the at least one abutment cavity comprising a first cavity portion adapted to engage with at least one part of the carrier portion of said dental implant abutment, the at least one abutment cavity comprising a second cavity portion adapted to lodge said abutment body of said dental implant abutment. The first and second cavity portions are coaxial to an axis and the second cavity portion is larger than the abutment body.

In the manufacture of dental prostheses, e.g. in metal using 3D laser printing, typically one or more bridges are formed. That is, one or more blanks or unworked/unmachined bridges are formed on the prosthesis by 3D laser printing, and then machined using an intricate machining tool while the prosthesis is on a machining jig, so as to produce the bridge (and prosthesis) in its final shape and form (e.g. conforming to the aforementioned master model). In doing so, it may be necessary for the machining to done to a precision of the order of 1/100ths of a millimeter. As used herein, a (dental/artificial) prosthesis may also be referred to as a "frame" or "framework".

WO2013167903 discloses a method of manufacturing an article (e.g. dental restoration), comprising taking an article formed in an initial state via an additive manufacturing process and performing a second manufacturing process to transform the article into a second state, which comprises mounting the article in a holding device, processing at least one first feature on the article, which comprises processing at least one set of mounting features on the article, re-mounting the article via the at least one set of mounting features, and then processing at least one second feature on the article.

BRIEF SUMMARY

The disclosure provides a mounting element for production of a dental prosthesis, a prosthesis and a method of manufacturing a dental prosthesis overcoming the problem that precise registration of the prosthesis with a reference position in relation to a master model, and therefore that techniques thereby enabling (e.g. form-fitting) mounting and alignment of the prosthesis in a precise position and/or orientation on the jig, are required.

In order to overcome the above-mentioned issue, the present disclosure relates to a mounting element for a dental prosthesis, the prosthesis including at least one bridge, the mounting element and prosthesis being formed using 3D printing, the mounting element having an axis of elongation and comprising: an engagement portion, configured for fixedly engaging the prosthesis; a registration portion configured for aligning, in use, the prosthesis in a precise position and/or orientation on a jig during machining; and an attachment portion, configured for enabling secure attachment of the prosthesis to the jig during said machining; wherein the registration portion comprises a tapering portion having a conically tapering outer surface.

An advantage of the disclosure is that it enables positioning the unworked dental prosthesis in a jig having a receiving portion shaped correspondingly to the registration portion, thereby enabling (e.g. form-fitting) mounting and alignment of the prosthesis in a precise position and/or orientation on the jig.

A further advantageous effect of the present disclosure is that it enables an unworked bridge or other element of the prosthesis to be machined with precision (e.g. to conform to a master model), e.g. with a precision of the order of 0.01 mm.

The axis of elongation may be aligned with or parallel to a plane containing the prosthesis.

Preferably, the conically tapering outer surface is a circumferentially disposed outer surface.

In an embodiment, a second axis defined by the conically tapering outer surface is aligned with or parallel to the axis of elongation.

Preferably, the registration portion further comprises at least one planar registration surface extending parallel to the axis of elongation. Preferably, the registration portion further comprises at least one planar inclined surface, continuous with the conically tapering outer surface, the or each inclined surface being inclined relative to the axis of elongation and intersecting a respective planar registration surface.

Preferably, the angle of taper of the tapering portion, the conically tapering outer surface and/or angle of inclination of the inclined surface relative to the axis of elongation is in the range 8-10 degrees, more preferably 9-11 degrees, and more preferably is 10 degrees.

Preferably, the mounting element further includes an open attachment recess, for example having a T-shaped axial cross section.

Preferably, the attachment recess includes an axially extending elongate lower recess portion, for example corresponding to the lower part of the "T", the lower recess portion being configured to receive, in use, a fixing element, for fixedly attaching the prosthesis to the jig. Preferably, said lower recess portion extends along the length of the registration portion.

Preferably, said attachment recess includes a transversely extending upper recess portion, for example corresponding to the upper part of the "T", the upper recess portion being configured to receive, in use, an upper portion of a fixing element, for fixedly attaching the prosthesis to the jig. Preferably, the upper recess portion defines an abutment surface, the abutment surface lying in a plane transverse to the axis of elongation and configured to be engaged, in use, by a surface of the upper portion of the fixing element. Preferably, said upper recess portion includes sidewalls extending parallel to the axis of elongation, the sidewalls being configured for guiding, in use, the upper portion of the fixing element into the upper recess portion.

Preferably, said upper recess portion includes endwalls in planes parallel to the axis of elongation, the endwalls being configured for receiving, in use, a correspondingly-shaped part of the upper portion of the fixing element into the upper recess portion; and/or wherein the endwalls are disposed on a side of the sidewalls opposite to an opening of the recess; and/or wherein the endwalls make an angle, for example 120 degrees, with each other.

According to another aspect of the present disclosure, there is provided a method of fabricating a dental prosthesis, comprising: providing a substrate; forming an unworked dental prosthesis on the substrate using 3D printing, the prosthesis including at least one bridge and a mounting element; removing the unworked dental prosthesis from the substrate; positioning the unworked dental prosthesis in a jig having a receiving portion shaped correspondingly to the registration portion, thereby enabling form-fitting mounting and alignment of the prosthesis in a precise position and/or orientation on the jig; fixing the unworked dental prosthesis in position using a fixing element engaging the mounting element and the jig; machining the at least one bridge to produce a final dental prosthesis; and removing the final dental prosthesis from the jig.

According to another aspect of the present disclosure, there is provided a dental prosthesis formed using 3D printing, the prosthesis including at least one bridge and a mounting element.

Preferably, said mounting element is formed integrally with the prosthesis using 3D printing.

BRIEF DESCRIPTION OF THE DRAWINGS

Further details and advantages of the present disclosure will be apparent from the following detailed description of a not limiting embodiment with reference to the attached drawings, wherein:

FIG. 1 shows (a) a perspective view of a dental prosthesis, incorporating a mounting element according to an embodiment of the disclosure, and (b) a lateral view and (c) a perspective general view of the prosthesis mounted on a jig during a fabrication method according to an embodiment of the disclosure;

FIG. 2 shows (a) a perspective view, (b) a front view, (c) a lateral view, (d) a bottom view and (e) a top view, of the mounting element of FIG. 1.

DETAILED DESCRIPTION

Figure 3:
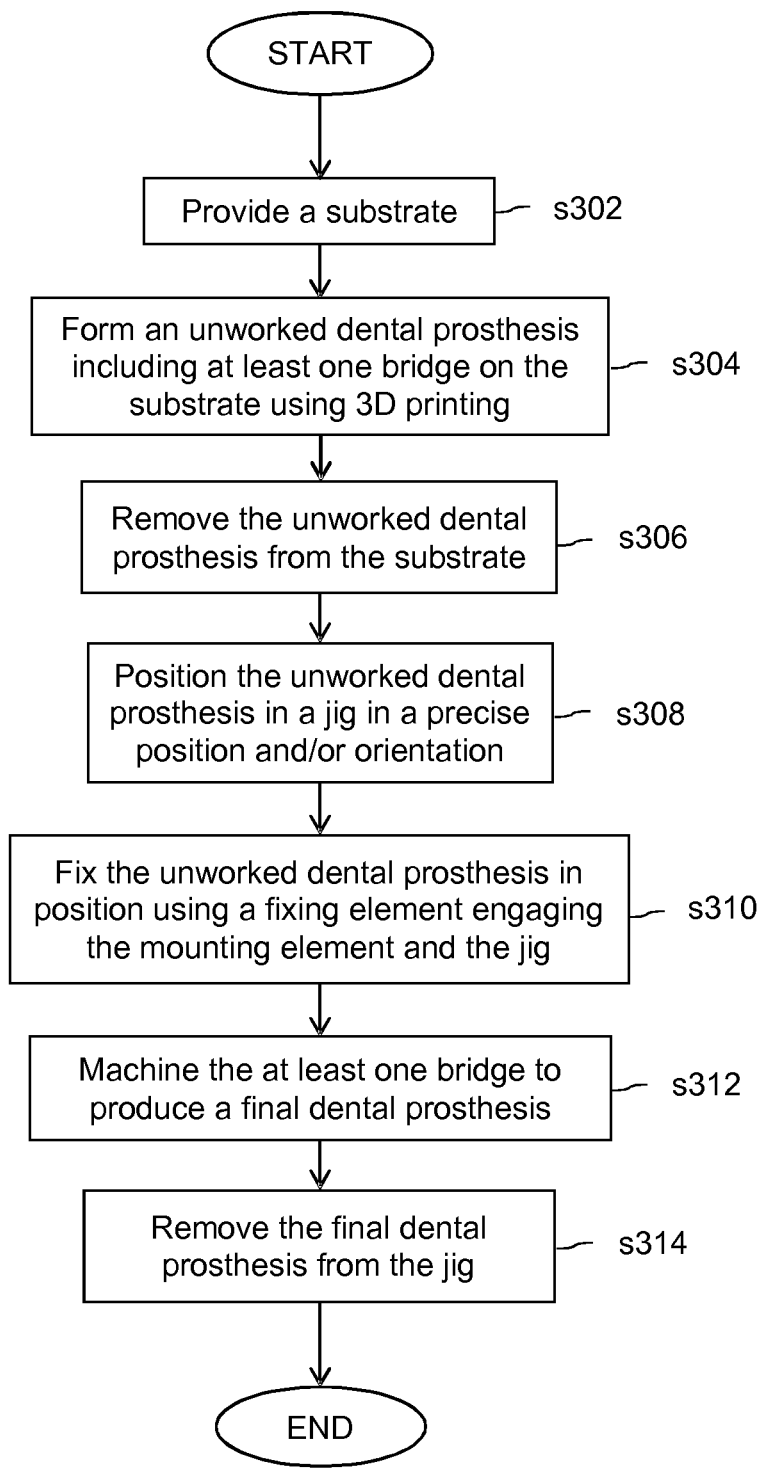
FIG. 3 shows schematically the method according to an embodiment of the disclosure for fabrication of a dental prosthesis.

In the following, like reference numerals denote like parts, and any element, design feature or method step of any embodiment may be used in combination with an element, design feature or method step of any other embodiment unless stated otherwise herein.

FIG. 1(a) shows a perspective view of a dental prosthesis 1, incorporating a mounting element 2 according to an embodiment of the disclosure. The dental prostheses may also be referred to as a "frame" or "framework". The prosthesis 1 includes a prosthesis body 3 in which prosthetic teeth 4 are provided. The mounting element 2 may be fixedly attached to the prosthesis body 3 by mechanical attachment (e.g. screws/bolts) or adhesive; however, the prosthesis 1 is preferably fabricated by 3D laser printing with the mounting element 2 and the prosthesis body 3 integrally formed.

The prosthesis 1 may be processed to incorporate a bridge, and in this respect, once the prosthesis 1 has been fabricated by 3D laser printing, i.e. to include an unworked bridge or blank 4', this may be machined (i.e. while on a jig), as described in more detail hereinafter. In FIG. 1(a), a completed/final bridge 4" (i.e. after machining) is shown in appropriately sized/shaped form, to resemble a tooth.

FIG. 1(b) shows a lateral view and (c) a perspective general view of the prosthesis 1 mounted on a holder 5 of a jig 6 during a fabrication method according to an embodiment of the disclosure. The holder 5 has a conically shaped upper portion on top of which is a locking device 7 to which mounting element 2 is attached during use of the jig 6. As shown in FIG. 1(c), the jig 6 preferably includes a rotatable base plate 8 upon which the holder 5 can be rotated (e.g. about a vertical axis), in use, during machining of the prosthesis 1.

Referring to FIG. 1(c), the locking device 7 includes a locking recess 9 for receiving the mounting element 2, and the locking recess 9 preferably includes inwardly tapering inner walls (not shown) for receiving and positioning the lower part, described in more detail hereinafter, of mounting element 2. Preferably, the locking recess 9 defines a front edge 10 for abutting, when the mounting element 2 has been received in locking recess 9, registration surfaces 11 of the mounting element 2. During operation, a bolt 12 engages part of mounting element 2 and fixedly attaches it to the holder 5, e.g. via an internal screw thread (not shown) or nut within the holder 5. Alternatively, a bolt (not shown) is inserted from below the top of the holder 5 and engages a nut (12) disposed within the mounting element 2.

FIG. 2 shows (a) a perspective view, (b) a front view, (c) a lateral view, (d) a bottom view and (e) a top view, of the mounting element 2 of FIG. 1. The mounting element 2 comprises an upper part 15 including an upper surface 16 for fixedly engaging the prosthesis (not shown). The mounting element 2 further comprises a registration portion 17, including bottom surface 18, for aligning, in use, the prosthesis in a precise position and/or orientation on a jig 6 (FIG. 1) during machining. The mounting element 2 has an axis 14 of elongation. The axis 14 of elongation may be aligned with or parallel to a plane containing the prosthesis 1. In this respect, the arcuate or roughly semi-circular prosthesis 1, or a centerline therethrough, is considered to extend in a path generally within a plane.

As seen especially in FIGS. 2(b) and 2(c), the registration portion 17 comprises a tapering portion, for example having a conically tapering outer surface 20. In this embodiment, the conically tapering outer surface 20 is a circumferentially disposed outer surface. In an embodiment, a second axis defined by the conically tapering outer surface 20 (i.e. an axis though the center of a circle whose circumference, at a given axial position, is provided by the conically tapering outer surface 20 at that point) is aligned with or parallel to the axis 14 of elongation.

Preferably, the registration portion 17 further comprises at least one planar registration surface 11 extending parallel to the axis. In this embodiment, the registration portion 17 further comprises at least one planar inclined surface 21, continuous with the conically tapering outer surface 20, each inclined surface 21 being inclined relative to the axis 14 (FIG. 2(b)) and intersecting a respective planar registration surface 11. The angle of taper of the tapering portion, the conically tapering outer surface 20 and/or angle of inclination of the inclined surface(s) 21 relative to the axis 14, may be in the range 8-11 degrees, more preferably 9-10 degrees, and more preferably is 10 degrees.

Finally, the mounting element 2 further comprises an attachment portion 19, for enabling secure attachment of the prosthesis 1 to the jig 6 (FIG. 1) during said machining. In this respect, and as best seen in FIGS. 2(b) and 2(c), the mounting element 2 further comprises an open attachment recess 22, for example having a T-shaped axial cross section. Preferably the attachment recess 22 includes an axially extending elongate lower recess portion 23, for example corresponding to the lower part of the "T", through which, in use, a fixing element (not shown; e.g. bolt 12 in FIG. 1) passes, for fixedly attaching the prosthesis 1 to the jig 6 (FIG. 1). The lower recess portion 23 in this embodiment extends the length of the registration portion 17.

In addition, in this embodiment, the mounting element 2 further comprises a transversely extending upper recess portion 24, for example corresponding to the upper part of the "T", in which, in use, an upper portion of a fixing element is disposed, for fixedly attaching the prosthesis to the jig.

Upper recess portion 24 preferably defines an abutment surface 25, the abutment surface 25 lying in a plane transverse to the axis 14 and being engaged, in use, by a surface of an upper portion of the fixing element (e.g. bolt 12 in FIG. 1). In addition, in this embodiment, the upper recess portion 24 includes sidewalls 26 extending parallel to the axis 14, for guiding, in use, the upper portion of the fixing element (e.g. bolt 12 in FIG. 1) into the upper recess portion 24.

In particular in the case where a bolt (e.g. hex headed; e.g. bolt 12 in FIG. 1) is used as the fixing element, the upper recess portion 24 includes endwalls 27 in planes parallel to the axis 14, for receiving, in use, a correspondingly-shaped part of the upper portion of the fixing element into the upper recess portion 24. Moreover, the endwalls 27 are suitably disposed on a side of the sidewalls 26 opposite to an opening of the attachment recess 22. Also, in this embodiment, the endwalls 27 make an angle, for example 120 degrees, with each other.

In FIG. 2, dimensions are given in mm for a specific embodiment.

FIG. 3 shows schematically the method according to an embodiment of the disclosure for fabrication of a dental prosthesis 1. Initially, a substrate is provided (step s302) upon which the prosthesis is to be formed. The next step comprises forming (step s304) an unworked dental prosthesis 1 on the substrate using 3D printing, the prosthesis including at least one bridge (i.e. unworked bridge 4'; FIG. 1(a)) and a mounting element 2, e.g. as described herein above with respect to FIGS. 1 and 2. Suitably, the forming (step s304) comprises using 3D laser printing. Such 3D printing, also known as additive manufacturing (AM) refers to a process used to synthesize a three dimensional object. 3D printing in metal mainly refers to an additive manufacturing process using sintering or melting (i.e. selective laser sintering, direct metal laser sintering and selective laser melting). As a result of step s304, a prosthesis 1 is formed including a number of bridges 4' that are as yet unmachined/unworked.

Returning to FIG. 3, next, the unworked dental prosthesis is removed from the substrate (step s306). Then, the fabrication process continues whereby the unworked dental prosthesis is positioned (step s308) in a jig having a receiving portion (see FIG. 1) shaped correspondingly to the registration portion 17 (see FIG. 2), thereby enabling form-fitting mounting and alignment of the prosthesis 1 in a precise position and/or orientation on the jig 6 (FIG. 1).

As seen in FIG. 3, the unworked dental prosthesis is then fixed (step s310) in position using a fixing element 12 engaging the mounting element 2 and the jig 6 (FIG. 1). In this condition, the prosthesis 1 is in precise registration (position/orientation) and ready to be machined.

Next, the at least one bridge 4' is machined (step s310) to produce a final dental prosthesis 1. This may comprise machining (using a fine tipped machining tool positionable in relation to the jig 6 for producing a predetermined shape, such as to conform to a master model) one or more unworked bridges 4' to produce final, shaped bridges 4, 4" (FIG. 1(a)).

While embodiments have been described by reference to embodiments of survey devices having various components in their respective implementations, it will be appreciated that other embodiments make use of other combinations and permutations of these and other components.

The invention claimed is:

1. A mounting element for a dental prosthesis, the prosthesis including at least one bridge, the mounting element and prosthesis being formed using 3D printing, the mounting element having an axis of elongation and comprising:
   an engagement portion, configured for fixedly engaging the prosthesis;
   a registration portion configured for aligning, in use, the prosthesis in a precise position and/or orientation on a jig during machining;
   an attachment portion, configured for enabling secure attachment of the prosthesis to the jig during said machining, said attachment portion includes an axially extending elongate lower recess portion, the lower recess portion being configured to receive, in use, a fixing element, for fixedly attaching the prosthesis to the jig;
   wherein the registration portion comprises a tapering portion having a conically tapering outer surface; and
   the mounting element further comprises sidewalls extending parallel to the axis of elongation, the sidewalls being configured for guiding, in use, an upper portion of the fixing element into a transversely extending upper recess portion, the upper recess portion includes endwalls in planes parallel to the axis, the endwalls being configured for receiving, in use, a correspondingly-shaped part of the upper portion of the fixing element into the upper recess portion,
   such that the fixing element is inserted in a first direction into the sidewalls and the fixing element is secured in a second direction, the second direction being transverse to the first direction.

2. The mounting element according to claim 1, wherein the conically tapering outer surface is a circumferentially disposed outer surface.

3. The mounting element according to claim 1, wherein a second axis defined by the conically tapering outer surface is aligned with or parallel to the axis of elongation.

4. A mounting element according to claim 1, wherein the endwalls are disposed on a side of the sidewalls opposite to an opening of the upper recess portion; and/or wherein the endwalls make an angle with each other.

5. The mounting element according to claim 1, wherein the axis of elongation is aligned with or parallel to a plane containing the prosthesis.

6. The mounting element according to claim 5, wherein an angle of taper of the tapering portion, the conically tapering outer surface and/or angle of inclination of the inclined surface relative to the axis of elongation is in the range 8-11 degrees.

7. The mounting element according to claim 1, wherein the registration portion further comprises at least one planar registration surface extending parallel to the axis of elongation.

8. The mounting element according to claim 7, wherein the registration portion further comprises at least one planar inclined surface, continuous with the conically tapering outer surface, the at least one planar inclined surface being inclined relative to the axis of elongation and intersecting a respective planar registration surface.

9. The mounting element according to claim 8, wherein said axially extending elongate lower recess portion corresponds to a lower part of a "T".

10. The mounting element according to claim 9, wherein said lower recess portion extends along the length of the registration portion.

11. The mounting element according to claim 8, wherein said transversely extending upper recess portion corresponds to an upper part of a "T", the upper recess portion being configured to receive, in use, an upper portion of a fixing element, for fixedly attaching the prosthesis to the jig.

12. The mounting element according to claim 11, wherein said upper recess portion defines an abutment surface, the abutment surface lying in a plane transverse to the axis of elongation and configured to be engaged, in use, by a surface of the upper portion of the fixing element.

13. Method of fabricating a dental prosthesis, comprising:
providing a substrate;
forming an unworked dental prosthesis on the substrate using 3D printing, the prosthesis including at least one bridge and a mounting element according to claim 1;
removing the unworked dental prosthesis from the substrate;
positioning the unworked dental prosthesis in a jig having a receiving portion shaped correspondingly to the registration portion, thereby enabling form-fitting mounting and alignment of the prosthesis in a precise position and/or orientation on the jig;
fixing the unworked dental prosthesis in position using a fixing element engaging the mounting element and the jig;
machining the at least one bridge to produce a final dental prosthesis; and
removing the final dental prosthesis from the jig.

14. A dental prosthesis formed using 3D printing, the prosthesis including at least one bridge and a mounting element according to claim 1.

15. A dental prosthesis according to claim 4, wherein said mounting element is formed integrally with the prosthesis using 3D printing.

* * * * *